United States Patent [19]

Picklesimer

[11] Patent Number: 4,788,487
[45] Date of Patent: Nov. 29, 1988

[54] CONTROL DEVICES AND METHODS FOR MOTOR HOME A/C SYSTEMS

[76] Inventor: H. Hansel Picklesimer, 1702 Hispana Ave., Ft. Pierce, Fla. 33482

[21] Appl. No.: 7,261

[22] Filed: Jan. 27, 1987

Related U.S. Application Data

[63] Continuation-in-part of Ser. No. 761,910, Aug. 2, 1985, abandoned.

[51] Int. Cl.$^4$ .................. H02P 9/00; F25B 27/00; B60H 3/04
[52] U.S. Cl. ........................................ 322/1; 322/8; 62/239; 62/244; 307/10 R; 307/149
[58] Field of Search ............... 322/1, 7, 8; 62/239, 62/243, 244; 307/9, 10 R, 10 LS, 149, 150

[56] References Cited

U.S. PATENT DOCUMENTS

| 4,217,764 | 8/1980 | Armbruster | 62/244 X |
| 4,236,594 | 12/1980 | Ramsperger | 307/10 LS X |
| 4,272,967 | 6/1981 | White et al. | 62/239 X |

Primary Examiner—R. J. Hickey
Attorney, Agent, or Firm—Carroll F. Palmer

[57] ABSTRACT

Devices and methods are provided for improving the operation of the on-board generator during use of air-conditioning in motor homes so the generator runs only when the thermostat demands the A/C unit(s) to run, as opposed to conventional motor-home A/C systems that require running of the generator even during intermittent shut-downs of the A/C unit(s). Such devices are formed of a plurality of time-delay relays connected with additional components in a unique arrangement with typical motor home electrical wiring, thermostat, A/C unit(s) and generator.

6 Claims, 2 Drawing Sheets

CONTROL DEVICES AND METHODS FOR MOTOR HOME A/C SYSTEMS

CROSS-REFERENCE TO RELATED APPLICATION

This application is a continuation-in-part of copending application Ser. No. 761,910, filed Aug. 2, 1985, now abandoned.

BACKGROUND OF THE INVENTION

1. Field of the Invention

This invention relates to motor home air-conditioning systems and methods. More particularly, it concerns devices and methods for improving the operation of on-board generators during use of air-conditioning in motor homes and the full utilization of multiple air-conditioning units.

2. Description of the Prior Art

The following disclosure of the invention discusses it with specific reference to motor homes. However, the invention is applicable to any comparable unit designed to provide mobile, personnel living quarters that are generally self-contained as to cooking, sleeping, toilet, power, etc., e.g., RVs, campers, trailers, boats or the like. Hence, the use of the term "motor home" throughout the specification and claims is intended to encompass all such type mobile living units.

In the conventional use of motor homes, whether on the road or without an external power source while stationary, the use of air-conditioning (A/C) requires operation of an on-board generator. This requires the push of a button to start the generator, then turn-on of the A/C and adjustment of the associated thermostat for the desired temperature. In such prior operations, the generator runs continually even though the A/C compressor is intermittently shut down by the thermostat. Not only is the continued running of the generator wasteful of fuel, but it is troublesome, particularly during sleeping hours, to the motor home occupants.

Many motor homes are equipped with more than one A/C unit, e.g., a plurality of roof units. In the conventional motor homes with multiple A/C units, when parked and plugged into external ac power, only one of the A/C units is operable. In many humid and/or hot environments, a single A/C unit is not sufficient to satisfactorily cool the motor home. In very recent motor homes, a switch has been provided that when actuated, allows more then one A/C unit to operate on the external power.

In view of the deficiencies with A/C operation in prior motor homes as indicated above, there exists a need for improvements in devices used to control operation of their A/C units in spite of numerous developments that have already been made in motor home A/C and refrigeration systems, including those disclosed in the following prior art U.S. patents:

| 3,841,108 | Pierrat | 1974  |
| 3,885,398 | Dawkins | 1975  |
| 3,984,224 | Dawkins | 1976  |
| 4,051,691 | Dawkins | 1977. |

The need to control refrigeration units in A/C systems or the like so as to coordinate with generator motors or other system motors in order to prevent system component damage is, of course, not unique with motor homes. Thus, the general problem exists relative to other vehicles, e.g., refrigerated trucks (see U.S. Pat. No. 2,962,873) and railway cars (see U.S. Pat. No. 4,006,603).

In an even broader sense, there exists many situations where timing the starting and stopping of internal combustion engines, whether used to power electrical generators or for other reason, upon repeated occurrences of temperature changes or other conditions, is required in order to protect the engine or other some other system unit against damage. Examples of this and of prior arrangements to solve the problem are found in the following prior art U.S. patents:

| 2,337,164 | Numero, etal.   | 1943  |
| 2,804,551 | McFarland       | 1957  |
| 3,691,393 | Papchristou     | 1972  |
| 4,463,305 | Wineland, etal. | 1984. |

OBJECTS

A principal object of the invention is the provision of new and improved control devices and methods for air-conditioning systems of motor homes.

Further objects include the provision of:

1. Means to improve the operation of the on-board generator during use of air-conditioning in motor homes so the generator runs only when the thermostat demands the A/C unit(s) to run.

2. New control devices for use in attaining such improved operation.

3. Such control devices that also enable motor homes to use simultaneously a plurality of A/C units while hooked into an outside (dockside) power supply.

4. Such control devices that are adaptable for all motor homes from those with only one A/C unit to those with two, three, etc.

5. Such control devices that provide standby protection for the motor home should there be a power failure or interruption when it is parked and plugged into an external 120 VAC power source to prevent the inside of the MH from overheating through sun exposure.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The stated objects are accomplished, in part, in accordance with the invention by the provision of new control devices formed of a plurality of time-delay relays connected with other undelayed relays in a unique arrangement with the motor home electrical wiring, thermostat, A/C unit(s) and generator.

In more detail, the invention modifies prior known motor home internal power generator and A/C unit arrangements to control such equipment so as to make them automatically control the A/C units by using a thermostat in combination with timing relays in such a manner that when a switch supplied in accordance with the invention is turned to automatic and the thermostat is set lower than the temperature inside the motor home, the following sequence of events occurs:

(a) the home's internal combustion engine driven generator starts up, (b) such generator IC engine is given time to reach loading speed, (c) then an A/C unit turns on to put a load on the generator and (d) if another A/C unit is used, it turns on only after a time delay following the turn on of the first A/C unit.

Further in accordance with the invention, after the A/C unit(s) have cooled down the motor home to the thermostat setting, the new control means will shut down the A/C unit(s) for a period of time before the generator is stopped to allow the generator IC engine to cool down before it is stopped to prevent "dieseling" when it comes to a stop.

Systems provided by the invention will permit continued repetition of the start up and shut down procedures as described to permit the interior of the motor home to be held to a narrow thermostat temperature range setting without continuous operation of an on-board generator.

Another feature of the invention makes it possible for motor homes to have a second external power cord (cable) so while the MH is parked and connected to external power, two or more A/C units may be operated on the external power, but the external power to the system via such second cord will be cut-off anytime the MH generator is operating.

Yet another feature of the invention provides standby protection to motor homes in the event of power failure or interruption when left unattended and plugged into an external power source.

BRIEF DESCRIPTION OF THE DRAWINGS

A more complete understanding of the invention may be had by reference to the accompanying drawings in which.

DESCRIPTION OF THE PREFERRED EMBODIMENTS

By way of introduction, comments relative to generators, circuit breaker panels and 12 VDC sources conventionally supplied with motor homes will be helpful in understanding the invention.

Figure 1:
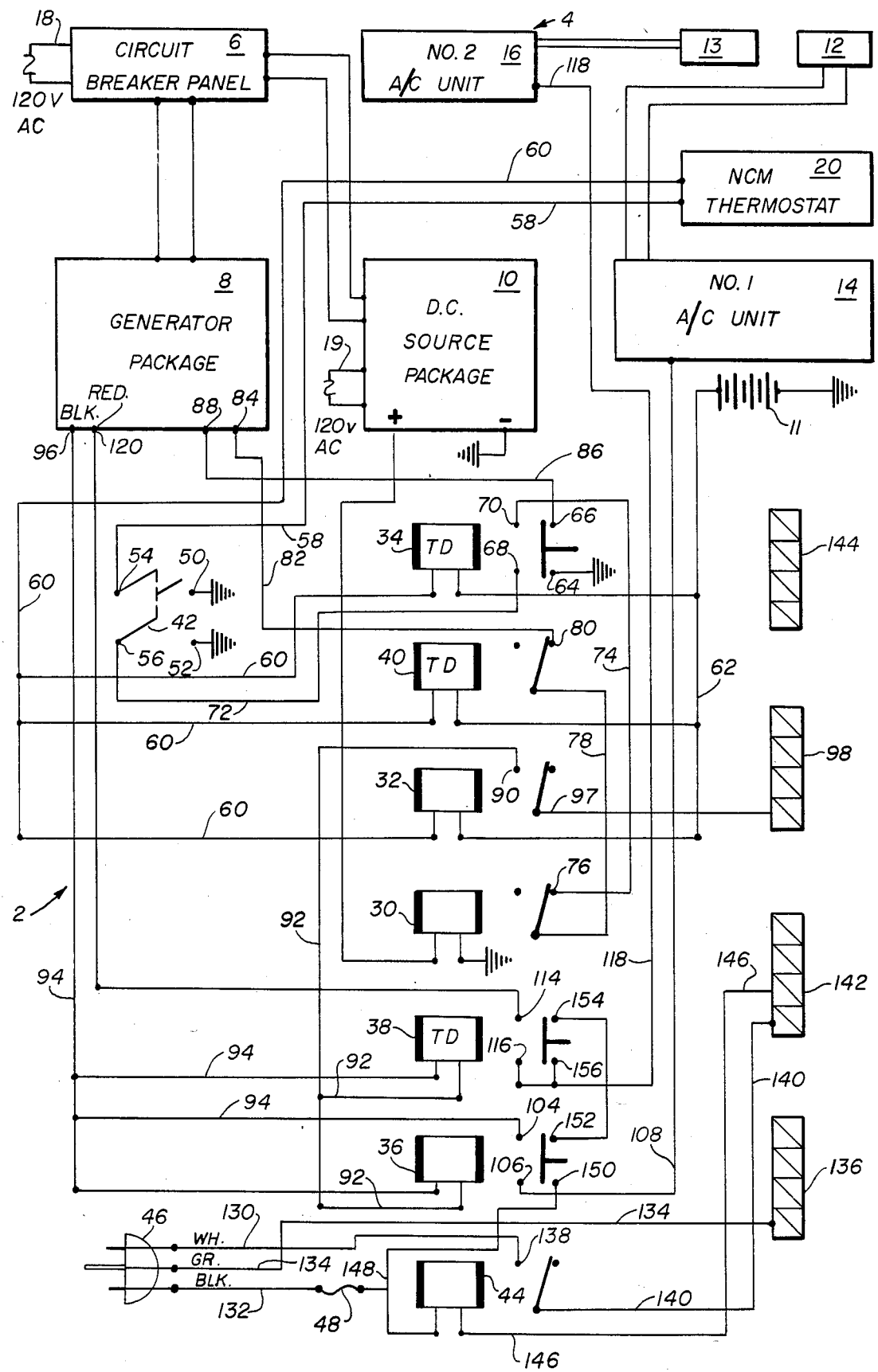
FIG. 1 is a schematic diagram of a first embodiment of a control system in accordance with the invention.
Figure 2:
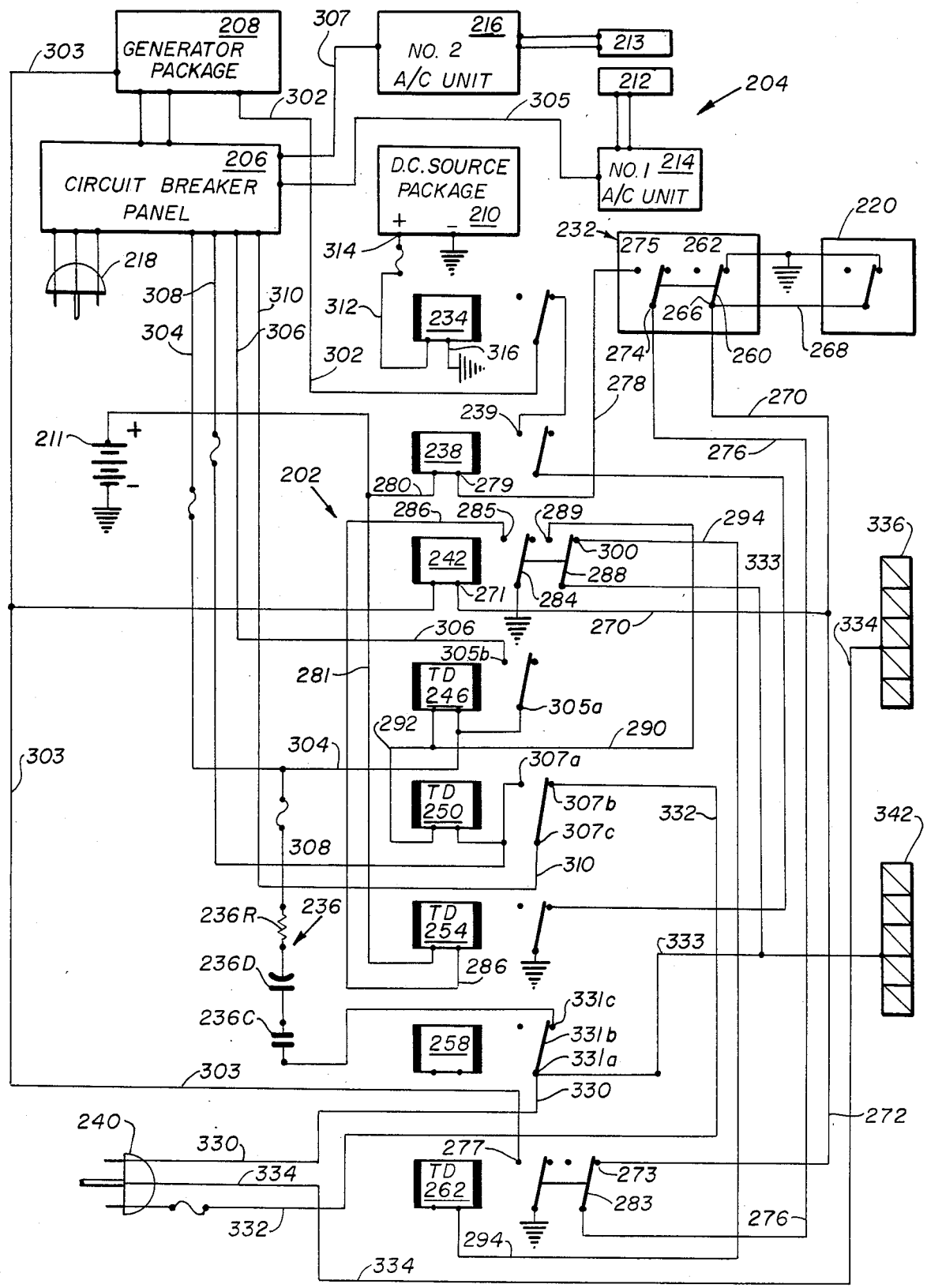
FIG. 2 is a schematic diagram of a second embodiment of a control system in accordance with the invention.

A typical motor home generator has two 120 VAC wires going to the circuit breaker panel, each carrying 120 VAC in phase, one red wire and one black wire. There is also a white (common) wire and a green (ground) wire. In FIGS. 1 & 2 for the sake of simplification, the common and ground wires are not shown in the AC circuits, except in the #2 power cable which is a part of the new control system of the invention, whereas in the DC circuits both plus and minus wires are shown.

The black wire from the generator supplies 120 VAC to a changeover relay. The red supplies 120 VAC to the circuit breaker panel for a #2 A/C unit.

The generator also has two wires leading to a stop-start switch, usually on the dash. One is a stop wire and the other a start wire.

The circuit breaker panels contain all the circuit breakers needed for the motor home. They also contain a relay to connect and disconnect the #1 power cable and the generator. Such relays are typically double pole, double throw with one-half for the 120 VAC and the other half for the power cable and generator common leads. Thus, if the power cable is plugged into an external power source and the generator is started, the power cable common and 120 VAC leads from the cable are disconnected and, simultaneously, the generator common and the black generator wires are connected. Hence, current is available in the motor home from the power cable only when the generator is not running.

The red generator wire goes directly from the generator to a #2 A/C circuit breaker in the breaker panel.

Typical 12 VDC power sources in motor homes have a relay to automatically supply DC current from an AC/DC converter when the motor home is on external or generator power or, otherwise, directly from the motor home battery.

Now referring in detail to the drawings, in which identical parts are identically marked and first to FIG. 1, the invention comprises a control system 2 of electrical relays for use in association with a conventional on-board electrical system 4 of a motor home or equivalent mobile unit.

The factory installed motor home electrical system 4 will typically comprise a circuit panel assembly 6, a generator package 8, D.C. voltage source package 10, battery 11, thermostat 12 as a built-in item of first air-conditioning unit 14, a second A/C unit 16 with its second thermostat 13, and power cords 18 & 19 to deliver 120 VAC current to the panel assembly 6 and the D.C. package 10.

The thermostats are typically the SPST cooling type.

The conventional operation of a motor home (MH) generator and A/C system is a follows:

When driving or whenever it is parked and the MH is not plugged into an external power source and the occupant wants to cool the MH with the first (roof) A/C unit 14, the occupant must push a button (not shown), e.g., a remote switch on the MH dash, to start the generator in the generator package 8. Then the A/C unit 14 is turned on and its thermostat 12 is adjusted for the temperature desired to be maintained in the MH. During all the time the A/C unit is used, the generator runs continuously.

Also, when the MH is parked where external power may be obtained from a lot-side outlet or the like into which the MH external power cord may be plugged, typically only one A/C unit in the MH will work. This is because a majority of MH electrical circuits are designed to draw only 20 amps since many RV camps do not provide any greater service outlets. The accessible amperage is controlled by the type of female plugs supplied at the dockside outlet and the male plugs supplied with the MH power cords.

In extremely hot and humid weather, having only one A/C unit operative is unsatisfactory to the MH occupants. This situation is eliminated in some recent MHs that are supplied with a switch to override a grounding protection feature and allow more than one A/C unit to operate at the same time through external power. However, this does not solve the problem associated with thousands of older MHs that are in need of means to permit use, with safety, of more than one A/C unit on external power.

The present invention provides new control means 2 (NCM) that can be applied to existing internal combustion engine generator units and control panels in a MH and enable such existing equipment to automatically control the MH A/C units with a thermostat 20 supplied as part of the NCM. This is done in such manner that when a switch supplied by the NCM 2 is switched to "automatic", the original MH thermostat 12 is turned to the lowest (coldest setting and the NCM thermostat 20 is set lower than internal ambient, the generator in package 8 will start up. Then, after it reaches running speed, one of the A/C units is automatically turned on to put only a partial load on the generator. After a suitable time, e.g., 60 secs., a second A/C unit (if installed) will turn on. Next, when the A/C units have cooled the MH to the setting of the NCM thermostat 20, the NCM 2 will first shut down the A/C units. Then after a given delay, e.g., 60 secs., to permit the IC engine of the generator to cool by running without load, in order to prevent "dieseling", the NCM 2 will shut off the generator IC engine. Hence, the generator will not run continuously when equipped in accordance with the invention and the automatic start up and stopping of the generator will be repeated over and over as required by the ambient circumstances.

Another feature of the invention makes it possible to add another external power cord to the MH electrical panel system so while the MH is parked and connected to external power, it is possible, even with older MHs, to use two A/C units at the same time on the external power source. Further, the NCM 2 of the invention is adaptable to MHs with A/C units in excess of two, e.g., 3, 5, etc.

The essential components of the control system 2 of the invention, in addition to the thermostat 20, comprise:
the following instant action relays:
  Relay 30, SPST normally closed 12 VDC, 5 amp.,
  Relay 32, SPST normally opened 12 VDC, 5 amp.,
the following delayed action relays:
  Relay 34, DPDT 12 VDC, 5 amp., 60 sec. off delay,
  Relay 36, DPDT 120 VAC, 20 amp., 5 sec. on delay,
  Relay 38, DPDT 120 VAC, 20 amp., 60 sec. on delay,
  Relay 40, SPST normally closed 12 VDC, 5 amp., 60 sec. on delay, and
a switch 42, DPST, 5 amp.

The control system 2 may additionally comprise:
Relay 44, SPST normally opened, 120 VAC, 20 amp., power cord 46 and in-line fuse 48.

The listed components of the control system 2 are connected together and to the existing elements 4–18 of the MH in the manner illustrated in FIG. 1. When so arranged, the operation of the MH cooling arrangements will be in accordance with the following description.

When the switch 42 is turned on, the existing manual push button (not shown) of the MH will no longer start the generator package 8 since it and the A/C units 14 & 16 are transferred to automatic control, completely dependent on the setting of the thermostat 20.

The switch 42 has poles 50 & 52 grounded to 12 VDC neg. (MH frame) while the pole 54 connects via line 58 to the thermostat 20 and pole 56 connects via line 60 to relay 34. When switch 42 is closed and the thermostat contacts are closed, this completes a circuit from battery 11 via lines 58, 60 and 62 energizing relays 32, 34 and 40. This opens contacts 64,66 and closes contacts 68,70 of relay 34 completing a circuit through switch 42 via lines 72 & 74, contact 76 of relay 30, line 78 & contact 80 of relay 40 and line 82 to starter post 84 of the generator package 8. This grounds the cranking relay (not shown) of the generator causing the IC engine (not shown) to crank and start up.

Also, when contact 66 of relay 34 opens, this ungrounds, via line 86, connection to post 88 of the ignition coil (not shown) of generator package 8 allowing the IC engine to start and run.

When the engine of generator package 8 begins cranking, relay 40 allows it to crank for only 30 seconds. If for any reason, the generator engine fails to start, relay 40 opens contact 80 breaking the circuit in line 82 and stops the cranking until relay 40 is reset by turning off switch 42 and then back on. This prevents damage to the starter of the generator package 8.

The energizing of relay 32 completes a circuit via contact 90, lines 92, 94 and output post 96 of generator package 8 through relays 36 & 38 and line 97 with the generator ac neutral 98 to energize the relays 36 & 38.

Further, in the D.C. source package 10, there is a relay (not shown) that changes over from battery to generator when the generator package 8 supplies 120 VAC. The coil of that relay is tapped to post 100 so that a 12 VDC current is supplied via line 102, when the generator package 8 delivers 120 VAC, to energize relay 30. When relay 30 is energized this verifies that the generator is running so contact 76 of relay 30 opens deenergizing lines 8, 82 to stop cranking of the generator starter.

When relay 32 has closed and the generator is running with relay 36 actuated for at least 5 seconds thereafter, the contacts 104, 106 of relay 32 are closed to send current via lines 94, 108 from the generator package 8 to the A/C unit 14. Further, relay 38 actuates 60 seconds later, to turn on A/C unit 16 via 120 VAC current through line 110, connected to red post 120 of generator package 8, contacts 114, 116 and line 118. Thus, the maximum load on the IC engine of generator package 8 is applied gradually.

As long as the contacts of thermostat 20 are closed, the generator package 8 will deliver 120 VAC current to the A/C units 14 & 16 via lines 108 and 118 respectively. When the MH temperature falls below the thermostat 20 setting, its contacts open. This de-energizes the coil of relay 34 opening contacts 68,70. Also, relays 32 & 40 are de-energized so contact 90 opens causing all A/C units to stop running.

Since relay 34 has a 60 sec. delay, contacts 64, 66 do not close for 60 seconds after shut off of the A/C units. This allows the IC engine of the generator package 8 to continue running for one minute longer. This delay mitigates the dieseling of the IC engine which can occur if it is shut down immediately with the shut off of the A/C units.

The relay 36 delay timing is a critical feature of the NCM 2 of the invention. This enables the generator in the package 8 to come up to speed before the load of the A/C unit 14 is applied to the generator. It has been found that a delay of two seconds is too short for this purpose, but the delay should be as short as possible, i.e., not over about 10 seconds. It is preferred that the relay 36 have an "on" delay of between about 3 to 7 seconds. A delay of 2 secs., for example, does not enable the cranking starter in the generator package 8 to bring the IC motor for the generator up to operational speed. While the relay is delayed in closing contacts 104 & 106, the DC circuits in the system receive an overvoltage of about 1–3 volts, e.g. 13–15 volts, so, for this reason, a delay of over 10 secs. should be avoided.

The optional #2 power cord 46 of the invention for use of external power to run multiple A/C units with dockside power comprises white line 130, black line 132 and green ground line 134. Ground line 134 connects to the common ground buss 136, which is isolated from the MH vehicle frame and to which the grounds of power cords 18 & 19 are also connected (not shown as explained above).

The line 130 connects to the contact 138 of relay 44 which functions with line 140 that is connected to the neutral buss 142, which is isolated from the other neutral buss 144 and from the MH vehicle frame.

Neutral busses 142 and 144 are parts of the conventional electrical wiring systems of MH vehicles. For example, neutral buss 144 will be connected (not shown) to the white wires of the power cord 18. Neutral buss 142, in the conventional MH wiring system serves the generator package 8.

The line 132 connects via the fuse 48 to the field of relay 44 which, in turn, connects to the neutral buss 142 via line 146. Line 132 also connects via line 148, contacts 150, 152 of relay 36 and contacts 154, 156 of relay 38 to line 118.

The power cord 46 functions to run A/C units with dockside power as follows.

When the power cord 46 is plugged in, 120 VAC goes via the fuse 48 and line 148 to contacts 150, 152, 154 & 156 to line 118 and, in turn, to A/C unit 16. At the same time, voltage is supplied to the field of relay 44, closing contact 138 and supplying external current via line 146 to the neutral buss 142.

The relay 44 arrangement is used for safety to completely isolate the #2 power cord while the onboard generator package is delivering AC current to the MH circuits to prevent accidental electric shock to a MH occupant via a metal part thereof to ground.

An important feature of the NCMs 2 of the invention is that if external (dockside) power is shut off, the generator package 8 immediately goes into operation if the thermostat 20 is set to a temperature below ambient and the generator runs until the thermostat opens when ambient temperature falls below the thermostat setting. The generator package 8 will cycle on and off as demanded by the thermostat 20 until the external power is restored, at which point the power cords 18, 19 and 46 take over again to supply the power to run the A/C units.

There are occasions where the thermostats 20 of the NCMs 2 of the invention, when installed in a MH, will not be used to control the temperature while using the A/C units. For example, if the generator package 8 is being used to supply current for watching TV or running a microwave oven, it would not be desirable to have the generator package 8 stop operating when the temperature in the MH drops below the desired level. In such cases, the original equipment thermostats 12 & 13 will be used to control the A/C units operation by leaving switch 42 open.

FIG. 2 shows another embodiment of the invention designed to improve functioning of the new control means 202 under extreme ambient conditions, e.g., heavy vibrations caused by rough roads while the MH is underway or by unusually high climatic temperatures such as 100° F.

In FIG. 2, the factory installed motor home electrical system 204 comprises a circuit panel assembly 206, a generator package 208, D.C. voltage source package 210, battery 211, thermostat 220 as a part of first air-conditioning unit 214, a second A/C unit 216 with second thermostat 213, and power cord 218 to deliver 120 VAC current to the panel assembly 206.

The essential components of the control system 202 of the invention, in addition to the thermostat 220, are: the following instant action relays:

Relay 234, SPST normally closed 12 VDC, 5 amp.,
Relay 238, SPST normally opened 12 VDC, 5 amp.,
Relay 242, DPDT, 12 VDC., 5 amp.,
Relay 258, SPST normally closed 120 VAC, 25 amp.,
the following delayed action relays:
Relay 246, SPST normally opened 120 VAC, 50 amp., 3-5 sec. on delay,
Relay 250, SPDT 120 VAC, 50 amp., 20 sec. on delay,
Relay 254, SPST normally closed 12 VDC, 5 amp., 5-15 sec. on delay,
Relay 262, DPDT 110 VDC, 5 amp., 60 sec. off delay,
a switch unit 232, comprising a DPDT switch, 5 amp., power cord 240,
in-line fuses 248 and
timer bridge 236.

The listed components of the control system 202 are connected together and to the existing elements 204-218 of the MH in the manner illustrated in FIG. 2. When so arranged, the operation of the MH cooling arrangements will be in accordance with the following description.

Relay 234 is used to disconnect the starter circuit when the generator package 208 delivers 120 VAC current to the system and causes the change-over relay (not shown) in the breaker panel 206 to switch from battery to generator.

Relay 238 has its coil connected via line 278 to contact 275 so that when the switch unit 232 is turned to the automatic position, relay 238 causes its normally open contact 239 to close completing a ground circuit via line 302 to the starter solenoid (not shown) in the generator package 208.

Relay 242 performs three functions. First, when the switch unit 232 is turned to the automatic position and thermostat 220 is closed, the normally open contact of tongue 288 in relay 242 closes to connect the coils of relays 246 & 250 to common so that as soon as the generator package 208 dispenses 120 VAC, the timers in relays 246 & 250 begin to count down and operate. Also, 120 VAC is dispensed via line 304 to contact 305a of relay 246, returns via contact 305b and line 306 plus a change over relay (not shown) in circuit breaker panel 206 to A/C unit 214 and MH outlets.

Second, at the same time, the tongue 288 opens the contact 300 to allow the generator to continue to run.

Third, tongue 284 normally open contact 285 closes to turn on the timer of relay 254, which is a safety device to limit the cranking time of the engine (not shown) in the generator package 208 should it fail to start within 5-15 seconds.

Relay 246 turns on and off A/C unit 214 and all the outlets and the main converter (not shown) which is an original portion of the MH circuit breaker panel 206.

Relay 250 turns on and off the A/C unit 216 via line 308 and normally open contact 307a of relay 250 and returns via line 310 to A/C unit 216. It also disconnects line 332 of the power cable 240 should the generator package start for some reason to deliver 120 VAC while the cable 240 is plugged into an external electrical outlet. This is a safety feature.

Relay 254 is a safety device to prevent the generator engine starter motor (not shown) from cranking for more than 5-15 seconds if the engine fails to start.

Relay 258 is a safety device to disconnect the common lead 330 of power cable 240 should the generator package 208 deliver 120 VAC for any reason while the cable 240 is plugged into external power.

Relay 262 performs two functions. First, when the switch unit 232 is turned to the automatic position, the tongue 288 of relay 242 closes contact 300 to start the timer of relay 262, then closes contact 277 and stops the engine of generator package 208 via line 303. Second, as the engine is being stopped, the normally closed contact 273 opens to disconnect the coil of relay 238 so that the starter of the generator engine will not reengage during shut down.

The timer bridge 236 comprises resistor 236R, diode 236D and capacitor 236C. This performs two functions. First, it changes 120 VAC to 110 VDC to permit the coil of relay 262 to operate on DC rather than AC current. Second, by using a capacitor 236C of selected capacity, e.g., 200 uf., this bridge 236, in effect, becomes an OFF timer for the relay 262 to keep its coil energized for 10–12 secs. after the generator package 208 stops delivering 120 VAC. This is a safety feature to prevent the generator engine from starting up again, just as it comes to a stop.

When the switch 232 is turned to the automatic position, the existing manual push button (not shown) of the MH will no longer start the generator package 208, although it will crank the starter motor, since it and the A/C units 214 & 216 are transferred to automatic control, completely dependent on the setting of the thermostat 220.

The switch unit 232 has contact 262 grounded to 12 VDC neg. (MH frame) and via line 264 to one terminal of the thermostat 220. The switch contact 266 connects via line 268 to the other terminal of thermostat 220, via line 270 to contact 271 of relay 242 and via lines 270 & 272 to contact 273 of relay 262.

The tongue 274 of unit 232 connects via line 276 to tongue 283 of relay 262 and from contact 275 of unit 232 via line 278 with coil contact 279 of relay 238.

When switch unit 232 is in the automatic position and the thermostat contacts are closed, this completes a circuit from battery 211 via lines 280 & 282 to relay 238 causing it to close and grounds the starter solenoid (not shown) in generator package 208 which causes the starter (not shown) to crank and start the generator engine (not shown). At the same time, the tongue 284 of relay 242 closes contact 285 turning on relay 254 via line 286 which allows the starter to crank no longer than 5 to 15 seconds should the engine fail to start.

Relay 242 gets 12 VDC voltage from such voltage always standing on the stop wire 303 from the generator package 208.

At the same time, tongue 288 of relay 242 connects contact 289 with the coil of relay 246 via lines 290 & 292 and relay 250 via line 290 in preparation to turn on both air conditioners 214 & 216 after the generator package 208 starts to produce current. Also, tongue 288 of relay 242 disconnects line 294 and the coil of relay 262 to allow the generator to continue to run after it starts.

After the generator package 208 starts to generate 120 VAC (about 3–4 secs.) the changeover relay (not shown) in circuit breaker panel 206 supplies current to DC source package 210 which, in turn, applies current to the coil of relay 234 and disengages the starter (not shown). Then, in about 3–5 seconds air conditioner 214 starts to run and in 20 seconds air conditioner 216 will start to run.

When the contacts in thermostat 220 open, this removes the ground from the coil of relay 242, causing relays 246 and 250 to open, thereby stopping air conditioners 214 & 216. This also turns on the timer of relay 262 to stop the generator 208 in 60 seconds.

The second power cable 240 has line 330 connected via contact 331a, tongue 331b & contact 331c to line 333 which connects to the common bus bar 342. Busses 342 & 336 are parts of the conventional equipment of panel 206, but are shown separately for better illustration in FIG. 2.

Line 332 of cable 240 is connected to contact 307b of relay 250 and ground wire 334 connects via line 334 to the ground bus 336 of panel 206.

When the power cable 240 is plugged into external power, current is supplied to A/C unit 216 via relay 250. As a safety feature, this is automatically disconnected by the control unit 202 in the event someone should manually start the engine of generator package 208. Also, when cable 218 is plugged in, voltage therefrom at relay 234 will not allow the generator package 208 to start, in effect, putting the control unit 202 on standby when switch unit 232 is in the Manual operation of the A/C units in the MH is performed by ignoring the new control system 202. By way of example for manual operation of system 202, switch unit 232 will remain in the manual position and the generator engine is started by the original MH equipment remote control switch (not shown). This allows the relays 246 & 250 to turn on the A/C units in sequence. The stopping of the generator engine is by the original remote control switch with the exception that as such switch is pushed to stop the generator engine, the unit 202 turns off both A/C units 214 & 216 to prevent any fluctuating voltages from going to the A/C units as the generator slows down.

As has been emphasized herein, the new control units on the invention are designed for integration into the electrical systems conventionally supplied in motor homes. For installing a control unit 202 in a motor home equipped with two roof mounted A/C units and having an automatic change-over relay as part of the electrical system, installation would proceed as follows:

1. Start the generator and make sure the A/C units 214 & 216 are working properly.

2. Remove the seat cushions or whatever is required to gain access to the rear of the electrical control panel 206. Typically these are made up of three sections, all fastened together, i.e., a front section, a rear section and the 12-volt section. There are a group of wires connecting the rear section to the front and the 12-volt section.

3. Take a voltmeter with a sharp prong test lead and check for 12 VDC by piercing one of the large white wires in this group while the generator is running. When the one with 12 VDC is found, mark it for a wire to be connected to later. There will be no voltage on this wire when the generator is stopped.

4. Stop the generator 208, unplug the power cord 218 and disconnect batteries 211.

5. Remove the cover from the panel 206.

6. Find a place on the MH to mount control unit 202 as close as possible to the panel 206 and not more than 6 feet therefrom. The unit 202 may be mounted in any position so long as access is provided to fuses mounted on the side of the unit.

7. Inside the front section of panel 206, find a time delay (TD) relay, unplug the small white wire from its coil and remove the screw from the other end of the wire at the normally open (N.O.) contacts of that DPDT relay. Discard this white wire and put a short jumper wire across the contacts of this TD relay while completely removing a large black wire connecting the relay to its N.O. contacts. This black wire is discarded.

8. Find a ¾" knock-out plug in the rear or side of panel 206. Route a piece of flexible tubing from control unit 202 to this plug hole and fasten it with a straight or 90° connector to the knock out hole. Then, feed wires 304, 306, 308, 310, 333 and 334 from unit 202 through the tubing to the inside of the front section of panel 206. None of these wires should be cut until final, correct connections are to be made.

9. The original wires from the generator 208 enter the panel 206 through one hole and are one each of red, black, white and green (or bare). Disconnect the black wire from panel 208 and connect it using a wire nut to wire 304 from unit 202. Take wire 306 from unit 202, cut it to correct length, put a terminal on it and connect it to the same screw from which the black wire from generator 208 was disconnected.

10. Wire 333 from unit 202 is fastened to the generator neutral bus bar 342 in panel 206.

11. Disconnect the A/C red wire from the generator circuit breaker in panel 206 and fasten it to wire 308 from unit 202. Fasten wire 310 to the generator breaker from which the red A/C wire was disconnected.

12. For a second power cord, make up a cord of desired length, attach a 15 amp. male plug to one end and connect wire 330 from unit 202 to the white wire in the power cord, connect wire 332 from unit 202 to the black wire in the power cord and connect the green wire from the power cord to the ground bar in panel 206. Secure cord 240 to panel 206 using code specified connection means. It may be necessary to enlarge the opening where power cords leave the MH so that both cords may be used at the same time.

13. Make sure all wiring inside the panel 206 is tied down and not rubbing against relay contacts.

14. Replace the cover on panel 206.

15. Unit 202 is supplied with an eight terminal block (not shown) for hookup of 12 VDC wiring. This terminal block will make connections to eight wires in unit 202 as noted below.

16. A wire is run from the white wire marked in step 3 above in panel 206 to connect to wire 312 of unit 202.

17. Wire 282 of unit 202 is connected to the 12 VDC battery 211.

18. A wire is run from the 12 VDC ground lug located at the rear of panel 206 and connected to wire 316 (MH ground) of unit 202.

19. Locate the cable that connects the MH remote start-stop (S/S) switch to generator 208. This is usually a flat ribbon type wire containing four wires.

20. Run wire 302 from unit 202 to connect with the red wire in the S/S cable.

21. Run wire 303 from unit 202 to connect with the green wire in the S/S cable.

22. Mount thermostat 220 at a suitable location in the MH. This is equipped with manual/automatic switch unit 232. Connect wire 278 from unit 202 to terminal 275 of unit 232. Similarly, connect wire 270 to terminal 266 and wire 274 to terminal 266.

23. Staple and tie all wires for neatness.

24. Open the generator package 208 and stick a label saying "DANGER ** STARTS AUTOMATICALLY" on the generator. Connect battery 211 and test the assembly by turning on both A/C units, setting their thermostats to coldness settings and turning switch unit 232 to the automatic position.

While the invention has been described with specific reference to electro-mechanical relays, the NCM of the invention may be constructed using instead electro-pneumatic relays, electronic devices or other equivalent units.

As will be apparent from the foregoing disclosure, the present invention provides improvements for MH A/C systems by permitting the MH generator to run only when the thermostat demands the A/C unit(s) to run, as opposed to conventional motor-home A/C systems that require running of the generator even during intermittent shut-down of the A/C unit(s).

Also, the invention provides standby protection against overheating of motor homes during hot weather in the event of power failure or interruption when left unattended and plugged into an external power source and an A/C unit is being used with proper thermostat setting to maintain an acceptable maximum temperature in the motor home.

The embodiments of the invention in which an exclusive property or privilege is claimed are defined as follows:

1. A control device for use in combination with the elecrical system supplied with a motor home air-conditioning (A/C) unit which is supplied with electric current, at least part of the time during its operation, by an internal combustion engine driven generator equipped with a cranking motor for starting sai engine, for the automatic control of the starting and stopping of said generator to minimize fuel and energy loss in the cyclic operation of said A/C unit which comprises:
   first means for beginnning of the operation of said A/C unit a first predetemined amount of time after the start of the running of said generator,
   second means to cause the running of said generator continuously with the operation of said A/C unit and
   third means for discountinuing said running of said generator a second predetermined amount of time after the termination of operation of said A/C unit,
   temperature sensing means for controlling operation of the A/C unit and starting of said engine,
   a power cord for supplying electrical current to said A/C unit in said motor home from an external power source and
   relay means for automatically disconnecting said power cord from said A/C unit when said generator is running,
   whereby upon ambient temperature raising above a predetermined temperature, said generator automatically starts and runs for said first predetermined amount of time before said A/C unit begins to run,
   said generator runs continuously with the running of said A/C unit and
   running of said generator is discontinued a second predetermined amount of time after the termination of said running of said A/C unit caused by said ambient temperature falling below said predetermined temperature.

2. The control device of claim 1 which includes:
   fourth means for supplying electrical current to said cranking motor of said internal combustion engine when said predetermined temperature is exceeded and fifth means for stopping said current supplying to said cranking motor in the event said generator fails to reach normal running speed within said first predetermined period of time.

3. A control device for use in combination with the electrical system supplied with a motor home air-conditioning (A/C) unit which is supplied with electric current, at least part of the time during its operation, by an internal combustion engine driven generator equipped with a cranking motor for starting said engine, for the automatic control of the starting and stopping of said generator to minimize fuel and energy loss in the cyclic operation of said A/C unit which comprises:

first means for beginning of the operation of said A/C unit a first predetermined amount of time after the start of the running of said generator comprising a DPDT relay with an on delay of between about 3 to 10 seconds, second means to cause the running of said generator continuously with the operation of said A/C unit and third means for discontinuing said running of said generator a second predetermined amount of time after the termination of operation of said A/C unit, and temperature sensing means for controlling operation of the A/C unit and starting of said engine, whereby upon ambient temperature raising above a predetermined temperature, said generator automatically starts and runs for said first predetermined amount of time before said A/C unit begins to run, said generator runs continuously with the running of said A/C unit and running of said generator is discontinued a second predetermined amount of time after the termination of said running of said A/C unit caused by said ambient temperature falling below said predetermined tempe ature.

4. The control device of claim 3 which includes:
a power cord for supplying electrical current to said A/C unit in said motor home from an external power source and
a SPST normally opened relay for automatically disconnecting said power cord from said A/C unit when said generator is running.

5. In combination with the electrical system supplied with a motor home air-conditioning (A/C) unit which is supplied with electric current, at least part of the time during its operation, by an internal combustion engine driven generator equipped with a cranking motor for starting said engine, the improvement, whereby upon ambient temperature raising above a predetermined temperature, said generator automatically starts and runs a first predetermined amount of time before said A/C unit begins to run, said generator runs continuously with the running of said A/C unit and running of said generator is discontinued a second predetermined amount of time after the termination of said running of said A/C unit caused by said ambient temperature falling below said predetermined temperature, of a control device for the automatic control of the starting and stopping of said generator to minimize fuel and energy loss in the cyclic operation of said A/C unit which comprises:

means including a first time delay relay with a delay of between about 3 to 10 seconds for beginning of the operation of said A/C unit a first predetermined amount of time after the start of the running of said generator, means including a second time-delay relay for running said generator continuously with the operation of said A/C unit, means including a third time-delay relay for discontinuing said running of said generator a second predetermined amount of time after the termination of said operation of said A/C unit, temperature sensing means for controlling operation of the A/C unit and starting of said engine, a power cord for supplying electrical current to said A/C unit in said motor home from an external power source and switch means for automatically disconnecting said power cord from said A/C unit when said generator is running.

6. An improved method of operating a motor home air-conditioning (A/C) unit which is suppied with electric current, at least part of the time during its operation, by an internal combustion engine driven generator equipped with a cranking motor for starting said engine, to control the starting and stopping of said generator to minimize fuel and energy loss in the cyclic operation of said A/C unit which comprises the following combination of steps:

automatically starting the running of the generator by a thermostat positioned in said motor home upon ambient temperature raising above a predetermined temperature, beginning of the operation of said A/C unit a first predetermined amount of time after the start of the running of said generator, running of said generator continuously with the operation of said A/C unit and automatically discontinuing said running of said generator a second predetermined amount of time after the termination of operation of said A/C unit caused by said ambient temperature falling below said predetermined temperature.

* * * * *